(12) United States Patent
Patel

(10) Patent No.: US 9,661,722 B2
(45) Date of Patent: May 23, 2017

(54) SYSTEM AND METHOD FOR MANAGING LIGHTING SYSTEMS

(71) Applicant: PHILIPS LIGHTING HOLDING B.V., Eindhoven (NL)

(72) Inventor: Maulin Dahyabhai Patel, Tuckahoe, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 16 days.

(21) Appl. No.: 14/429,577

(22) PCT Filed: Aug. 28, 2013

(86) PCT No.: PCT/IB2013/058053
§ 371 (c)(1),
(2) Date: Mar. 19, 2015

(87) PCT Pub. No.: WO2014/045138
PCT Pub. Date: Mar. 27, 2014

(65) Prior Publication Data
US 2015/0237703 A1   Aug. 20, 2015

Related U.S. Application Data

(60) Provisional application No. 61/704,026, filed on Sep. 21, 2012.

(51) Int. Cl.
*H05B 37/02* (2006.01)
(52) U.S. Cl.
CPC ..... *H05B 37/0218* (2013.01); *H05B 37/0227* (2013.01)

(58) Field of Classification Search
CPC . H05B 37/02; H05B 37/0218; H05B 37/0227
USPC .......................... 315/149, 152, 307, 308, 312
See application file for complete search history.

(56) References Cited

U.S. PATENT DOCUMENTS

| | | |
|---|---|---|
| 4,220,412 A | 9/1980 | Martin |
| 4,236,101 A | 11/1980 | Luchaco |
| 4,347,461 A | 8/1982 | Carlson |
| 4,701,669 A | 10/1987 | Head |
| 5,193,900 A | 3/1993 | Yano |
| 5,548,398 A | 8/1996 | Gaboury |
| 5,701,058 A | 12/1997 | Roth |
| 5,721,471 A | 2/1998 | Begemann |

(Continued)

FOREIGN PATENT DOCUMENTS

| | | |
|---|---|---|
| WO | 9615649 A1 | 5/1996 |
| WO | 9615650 A1 | 5/1996 |

OTHER PUBLICATIONS

Galasiu, A.D. et al "Occupant Preferences and Satisfaction with the Luminous Environment and Control Systems in Daylit Offices: A Literature Review", Energy and Buildings, vol. 38, No. 7, 2006, pp. 728-742.

*Primary Examiner* — Tung X Le

(57) ABSTRACT

This invention discloses a method and system for managing artificial lighting sources to provide acceptable quality of lighting while reducing cost of operation of the artificial lighting sources. In one aspect of the invention, at least one color characteristic of the artificial light source is adjusted based on an illuminance of a natural light source and the at least one color characteristic of the artificial light source.

15 Claims, 10 Drawing Sheets

(56) References Cited

U.S. PATENT DOCUMENTS

| | | |
|---|---|---|
| 7,288,755 B1 | 10/2007 | Fassbender |
| 7,768,189 B2 | 8/2010 | Radkov |
| 2003/0058350 A1 | 3/2003 | Ishimaru |
| 2005/0110416 A1* | 5/2005 | Veskovic .................. E06B 9/32 |
| | | 315/149 |
| 2005/0237733 A1 | 10/2005 | Laski |
| 2009/0207604 A1 | 8/2009 | Robotham |
| 2009/0322253 A1 | 12/2009 | Buelow |
| 2011/0089842 A1 | 4/2011 | Aldrich |
| 2012/0001841 A1* | 1/2012 | Gokingco ................. G01J 1/32 |
| | | 345/102 |
| 2012/0206050 A1 | 8/2012 | Spero |
| 2013/0002144 A1* | 1/2013 | Adler ....................... F21S 2/00 |
| | | 315/153 |
| 2013/0154486 A1* | 6/2013 | Barrilleaux ........ H05B 37/0245 |
| | | 315/158 |

* cited by examiner

SYSTEM AND METHOD FOR MANAGING LIGHTING SYSTEMS

CROSS-REFERENCE TO PRIOR APPLICATIONS

This application is the U.S. National Phase application under 35 U.S.C. §371 of International Application No. PCT/IB2013/058053, filed on August 28, 2013, which claims the benefit of U.S. Provisional Patent Application No. 61/704,026, filed on Sep. 21, 2012. These applications are hereby incorporated by reference herein.

This application is related to the field of lighting and more particularly to a system and methods for managing light to provide for increased luminous efficacy and reduced costs.

Existing lighting systems, such as those in office buildings, homes, parking lots, garages, etc., provide for safe and comfortable environmental conditions in which people may live and work.

However, conventional lighting systems use a significant amount of energy as the lighting sources may be in operation even when there is no need for the operation of the light source. For example, in an office or home having a window, the entry of natural light into the office may mitigate the need for the operation of the lighting system.

Thus, there have been many techniques employed to reduce the energy consumption of lighting sources and even the need for the operation of a lighting source. For example, florescent and CFL (Compact Florescent Light) lighting sources are replacing incandescent lighting sources. LED (Light Emitting Diodes) are an available technology that is being applied as lighting sources.

In addition, to control the operation of the lighting sources (no matter the type of lighting source) motion-sensors are used to turn-on lighting sources when a user enters an area. The lighting is turned off when the user exits the area and no subsequent motion is detected. Similarly, photo-sensors are used to reduce the intensity of light sources based on an ambient light condition surrounding the lighting sources.

Thus, while the changing of the type of lighting source and the operation of the lighting source are providing the significant cost and energy reduction, there remains a need in the industry for further improvements in reducing energy consumption and cost.

It is the object of the invention claimed to provide a method and system that provides for dynamic adjustment of characteristics of artificial lighting sources to provide acceptable lighting conditions while reducing cost of operation in creating the acceptable lighting conditions.

In one aspect of the invention, a method for managing lighting in an environment, the method comprising: receiving illuminance information associated with at least one artificial lighting source within said environment; determining an illuminance value associated with a natural light source; determining a measure of said illuminance of said natural light source with respect to an illuminance of a mixed light, said mixed light representing said at least one artificial lighting source and said natural light source; adjusting said illuminance of said at least one artificial light source to achieve a target level of illuminance of said mixed light; and determining at least one additional characteristic of said mixed light based on a corresponding at least one additional characteristic of said at least one artificial light source and said natural light source; and adjusting said at least one additional characteristic of said at least one artificial light source to maintain a target level of said at least on additional characteristic, wherein said adjustment is based on said determined measure of illuminance of said natural light source with respect to said illuminance of a mixed light.

As would be appreciated, the term artificial lighting source may represent one or more different types of lighting sources, such as Light Emitting Diode (LED), and other similar type electrical light sources.

In another aspect of the invention, a system for managing lighting within an environment is disclosed. The system comprises a plurality of sensor units within said environment; a computer or processor in communication with said plurality of sensor units and a memory, the memory including code, which when accessed by said processor, causes said processor to execute the steps of: receiving inputs from selected ones of said plurality of sensor units; determining each of an illuminance from at least one artificial lighting source and a natural light source; determining a factor associated with the percentage of illuminance provided by said natural light source with respect to a total illuminance provided by a combination of said natural light source and said at least one artificial lighting source; and adjusting at least one of: the illuminance of said at least one artificial light source and at least one additional characteristic of said at least one artificial light source to a corresponding target level based on said illuminance of said natural light source and a corresponding at least one additional characteristic associated with said natural light source, wherein said adjusting of said at least one additional characteristic is based on said determined factor.

In another aspect of the invention, the characteristics of may be adjusted based on natural lighting conditions, demand response signal, occupancy sensing, scheduling and operating conditions.

The advantages, nature, and various additional features of the invention will appear more fully upon consideration of the illustrative embodiments to be described in detail in connection with accompanying drawings wherein like reference numerals are used to identify like element throughout the drawings.

It is to be understood that the figures and descriptions of the present invention described herein have been simplified to illustrate the elements that are relevant for a clear understanding of the present invention, while eliminating, for purposes of clarity many other elements. However, because these elements are well-known in the art, and because they do not facilitate a better understanding of the present invention, a discussion of such element is not provided herein. The disclosure herein is directed to also variations and modifications known to those skilled in the art.

Figure 1A:
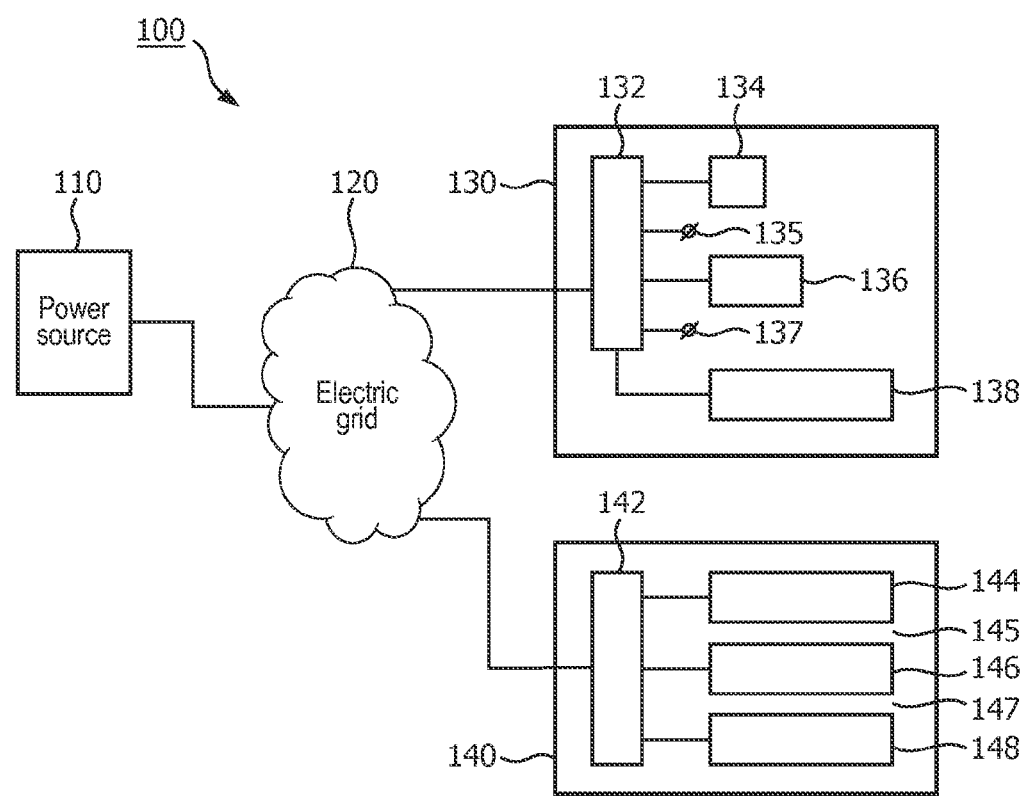
FIG. 1A illustrates an exemplary electrical network configuration.

FIG. 1A represents an exemplary electrical network 100 comprising a power source 110, an electrical grid 120 receiving power from the power source 110 and providing the power to a plurality of load devices within corresponding area 130, 140. Power source 110 may be one or more of a coal-fired electrical generation plant, a nuclear electrical generation plant, a hydro-electrical generation plant or any other conventional electrical generation plant. In addition, power source 110 may be a renewal energy generation plant. For example, wind, solar, biofuel, etc.

The areas or environments 130, 140, may represent office buildings, shopping malls, homes, garages, parking lots, tunnels, and other similar areas that require electrical power to provide illumination in one or more areas. For example, area 130 depicts different enclosed areas 134, 136, 138 and two open areas 135, 137. Power is provided to each of these areas via a power distribution system 132. Area 140, similarly, illustrates three enclosed areas 144, 146, 148 and two open areas 145, 147, which receive power from power distribution system 142. As would be appreciated, areas 130, 140 and the number of enclosed and open areas within each of these areas 130, 140 is only to illustrate the principles of the present invention and the number of areas and enclosed and open areas within each area 130, 140 may be changed without altering the scope of the invention claimed.

Figure 1B:
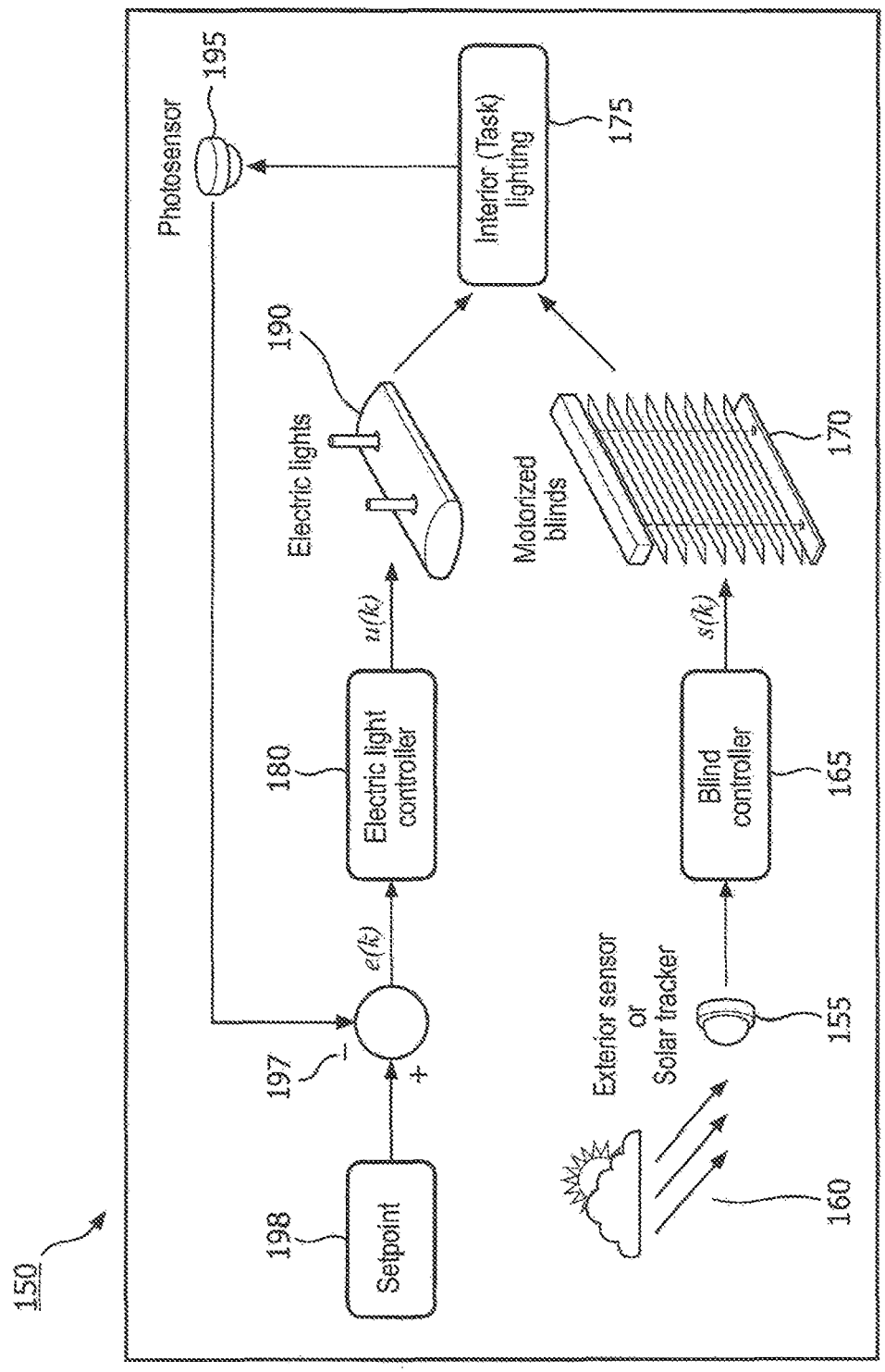
FIG. 1B illustrates an exemplary light management system.

FIG. 1B illustrates an exemplary light management system 150. FIG. 1B illustrates a light management system suitable for an area such as 134, which includes a window that provides for entry of natural light into the area. However, it would be recognized that the principles of the light management system 150 depicted in FIG. 1B would also be applicable to other area (e.g., 136 and 138) with appropriate inclusion or removal of the blind controller 165 and corresponding adjustment to the set point 198.

In FIG. 1B, natural light 160 enters an area (or space or zone) typically through one or more window and/or skylights. The illuminance of the entering natural light may be measured by one or more exterior sensors or solar trackers 155. Information from the exterior sensors, for example, may be provided to a blind controller 165 that provides control signals to motorized blinds 170 to increase and/or decrease the amount of natural light entering the space or environment. The blind controller may, for example, include a processor that determines a position (height and slat angle of the blind elements) based on a desired level of natural light. This desired level of natural light may be predetermined based on time, for example, or may be provided by an external input (not shown).

In addition, an electric light (artificial light) controller 180 provides control signals to one or more electric or artificial light sources 190. The control signals may be used to adjust an illuminance of the artificial light source and, as will be described with regard to the invention claimed, one or more additional characteristics of the artificial or electric light source 190.

The combination of the natural light provided to through the motorized blinds 170 and the artificial light provided through the electric light source 190 is then measured by a photosensor 195. Photosensor can ascertain the contribution of daylight and artificial light to overall illuminance. An output of the photosensor 190 is then provided to in this illustrated example, an adder 197, that determines a desired level of illuminance (and other additional characteristics) of the artificial or electric light source 190, based on a desired set point 198. The set point 198 may be determined based on criteria, such as occupancy, time of day, utility pricing, user input etc.

Although FIG. 1B illustrates element 197 as an adder, it would be recognized that the element 197 may also represent a processor that processes the information provided digitally. Similarly, the elements of setpoint 198, electric light controller 180 and blind controller 165 may also be represented by one or more processors that process information provided in a digit manner.

In addition, the set point for illuminance and other additional characteristics of the electric light source may be set in a predetermined manner or schedule, such as based on time of day, or may be set in response to received commands (not shown) that require that the electric or artificial light sources be adjusted based on changing conditions. For example, a utility supplier, in cases of emergency, may require that the electrical consumption be reduced and, thus issue commands that cause the set point to be changed and, hence, overriding any previous predetermined schedule. Or the set point may be changed from a predetermined schedule based on whether the space or area remains occupied during times that the predetermined schedule fails to consider that space or area being occupied. Or the set point may be changed from a predetermined schedule based on a received input value. For example, a space that is unoccupied may be operating in a low lighting condition mode (e.g., a museum) when a space is unoccupied. However, an input may be received (from a motion sensor) that indicates the space may be occupied and the light condition may be raised to a higher or more comfortable lighting mode. In another example, a space that is occupied may be operating in a comfortable lighting mode but may require a further higher lighting condition upon demand. In this case, an input may be processed that causes an even higher level of lighting to be achieved.

Figure 2:
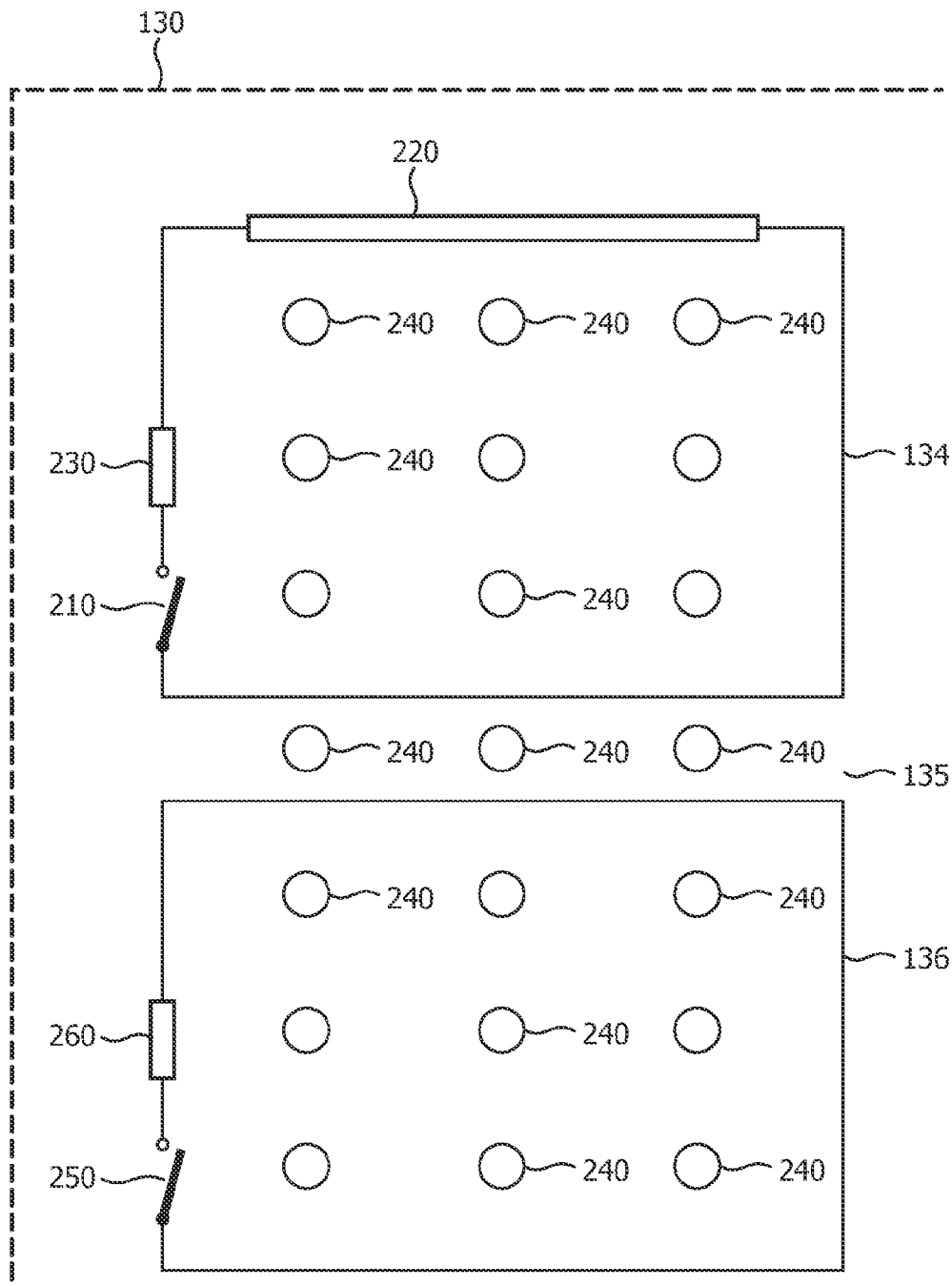
FIG. 2 illustrates an expanded view of the exemplary electrical network configuration shown in FIG. 1A.

FIG. 2 illustrates an expanded view of areas 134, 135, 136 within area 130. Area 134, for example, includes at least one window 220 and a door 210. Window 220 allows the entry of a natural light into the area 130. Area 130 further includes at least one illumination or lighting element 240 that provides lighting to the area. A switch 230 turns on or off selected ones of the lighting elements 240 within area 130. Switch 230 may be one of a conventional on/off switch, a motion sensor switch, and an ambient light sensor or other device that may control the illumination output of lighting elements 240.

Area 135 is on open or utility area that also includes at least one lighting element 240. The utility area 135 may represent a corridor between different areas. A switch controlling the lighting elements 240 within the utility area 135 may be local or may be remote to the area, wherein the remote switch may control lighting elements in a plurality of utility areas.

Area 136 represents an enclosed area that includes a door 250 but lacks a window. In this case, the illumination provided by illumination or lighting elements is the only source of illumination in area 136.

In accordance with the principles of the invention, methods for managing the lighting elements in each area type is disclosed.

With reference to area 134, which includes both daylight and at least one electrical (i.e., artificial) light source, it is known that the intensity of the light generated by the artificial light source may be reduced as the intensity of the daylight increases.

However, luminous efficacy and Color Rendering Index (CRI) are two key performance metrics of light sources. Luminous efficacy of a source is a measure of how efficiently a light source produces visible light. It is the ratio of total luminous flux emitted and input electric power. Luminous efficacy is typically expressed in lumens per Watt (lm/W) in SI units.

CRI is the measure of a light source's ability to render the true colors of physical objects in comparison with an ideal or natural light source. The color rendering performance of a source is determined by its spectral power distribution. A broad emission spectrum distributed throughout the visible region generally results in high CRIs. A predefined form of natural light and a black body radiator have a CRI value of 100. For general illumination purposes CRI values in the 70s are considered 'acceptable', and values greater than 80 are considered as 'good'. Higher CRI light sources are desirable in studios, museums, art galleries and exhibition halls whereas high luminous efficacy sources are desirable in street lighting applications.

Luminous efficacy and color rendering are determined solely by the spectrum of the source. A fundamental trade-off exists between the luminous efficacy and CRI. In other words, improvements in luminous efficacy come at the expense of CRI and vice versa. Modern light sources, such as LEDs, enable dynamic tuning of CRIs.

Thus, in accordance with the principles of the invention it is desired to maintain the CRI of a combination of daylight and artificial light (i.e., mixed-light) at a desired target level while dynamically adjusting the CRI of electric light source in response to variation in daylight. Since the CRI of the daylight is close to 100, if the contribution of daylight in the mixed light increases then the CRI of artificial light source can be reduced while maintaining the CRI of the mixed light above a desired, target, or predetermined level. For example, during night when daylight is absent, the CRI of the artificial light source can be set to a desired value (e.g., 85) to maintain a quality lighting environment. On the other hand, when the contribution of daylight and artificial light are equal (e.g. 50% each) in a mixed visible light environment, then the CRI of the artificial light can be set to a lower value (e.g., 70) while attaining an overall desired CRI for the mixed light. That is, a lower CRI of 70 with 50% contribution and a daylight CRI of 100 with 50% contribution results in a total CRI of 85 (i.e., 70*0.5+100*0.5=85). In this case significant energy savings can be attained while maintaining the quality of mixed light.

Figure 3:
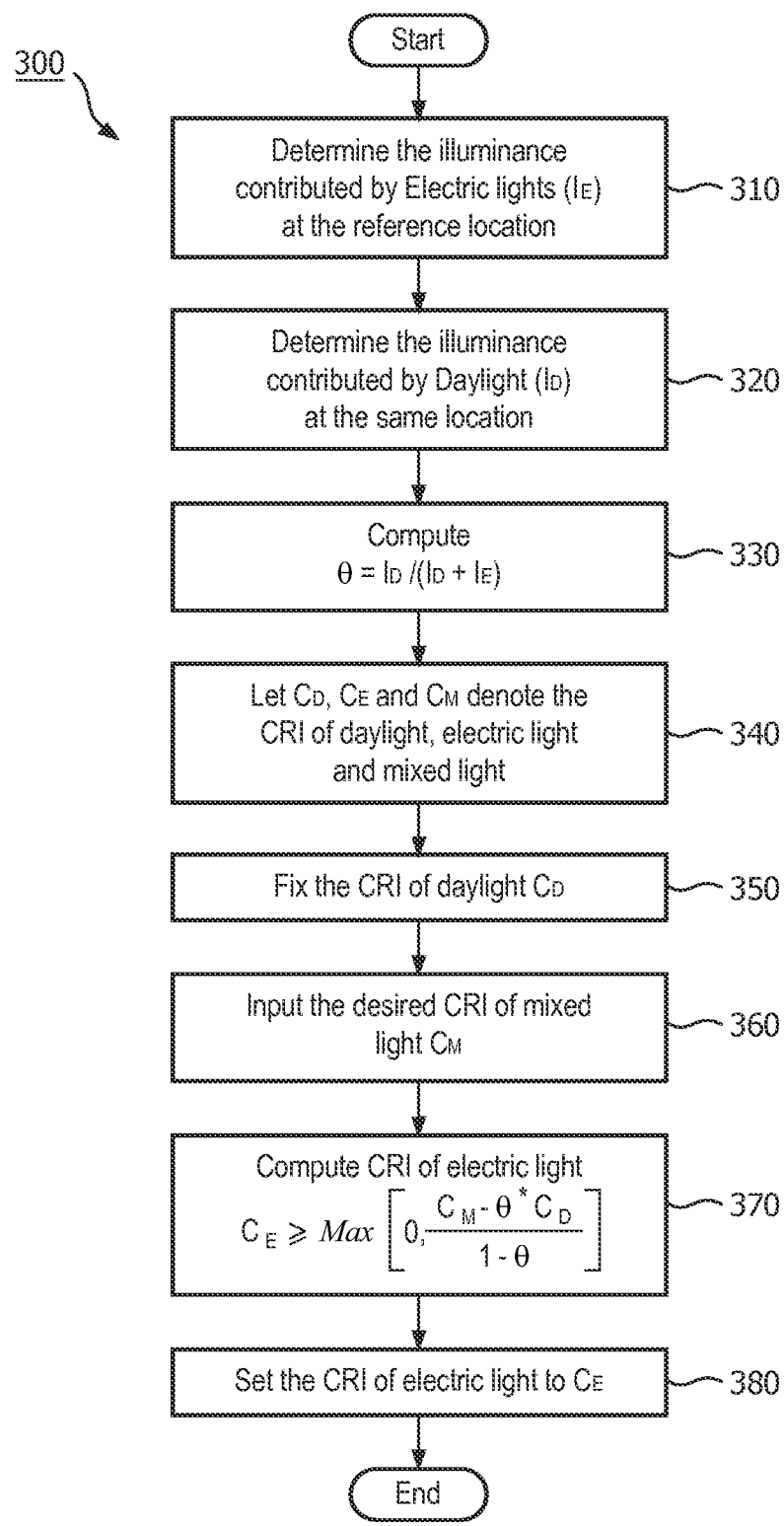
FIG. 3 illustrates a flow chart of an exemplary process in accordance with the principles of the invention.

FIG. 3 illustrates a flow chart of an exemplary process 300 for controlling CRI in view of a lighting condition in accordance with the principles of invention. In this exemplary process, overall illumination, at a reference location (e.g., area 134), is the sum of daylight illuminance, $I_D$, and artificial light illuminance, $I_E$. At step 310 a determination is made of the illumination of the electric (artificial) light intensity and at step 320 a determination is made of the illuminance of the daylight (natural light) at the reference location. At block 330, a determination is made of a ratio (denoted by $\theta$) of daylight illuminance $I_E$ to overall illuminance ($I_D+I_E$) at the reference location.

$$\theta = \frac{I_D}{I_D + I_E}, 0 \le \theta \le 1$$

A normalized contribution of electric light to overall illuminance at the same location is given by $1-\theta$.

$$1 - \theta = \frac{I_E}{I_D + I_E}$$

At block 340, the CRI of each of the artificial light sources, the daylight and the mixed light are obtained and/or determined. The CRI of daylight, electric light and mixed (i.e., daylight+electric light) light are denoted by $C_D$, $C_E$ and $C_M$ respectively. The relationship between these quantities is characterized by the following equation.

$$\theta C_D + (1-\theta)C_E = C_M$$

The CRI of daylight is well known and can be fixed (block 350).

The real-time value of $\theta$ can be determined using photo-sensors (see FIG. 1B). As mentioned earlier, the preferred CRI of mixed light is application dependent. For general illumination purposes CRI values in the 70s are considered 'acceptable', and values greater than 80 are considered as 'good'. Thus, a target CRI value may be set based on conditions that may be determined based on the desires of the user.

For a given application, the desired value of CRI for the mixed light can also be fixed (block 360). Thus, a minimum value of CRI for electric light to maintain a CRI of mixed light at or above a desired threshold (target level) can be derived at block 370 as:

$$C_E \ge \text{Max}\left[0, \frac{C_M - \theta * C_D}{1 - \theta}\right]$$

At block 380, maintaining the CRI of electric light at least $C_E$ will ensure that CRI of mixed light is at least $C_M$.

Figure 4:
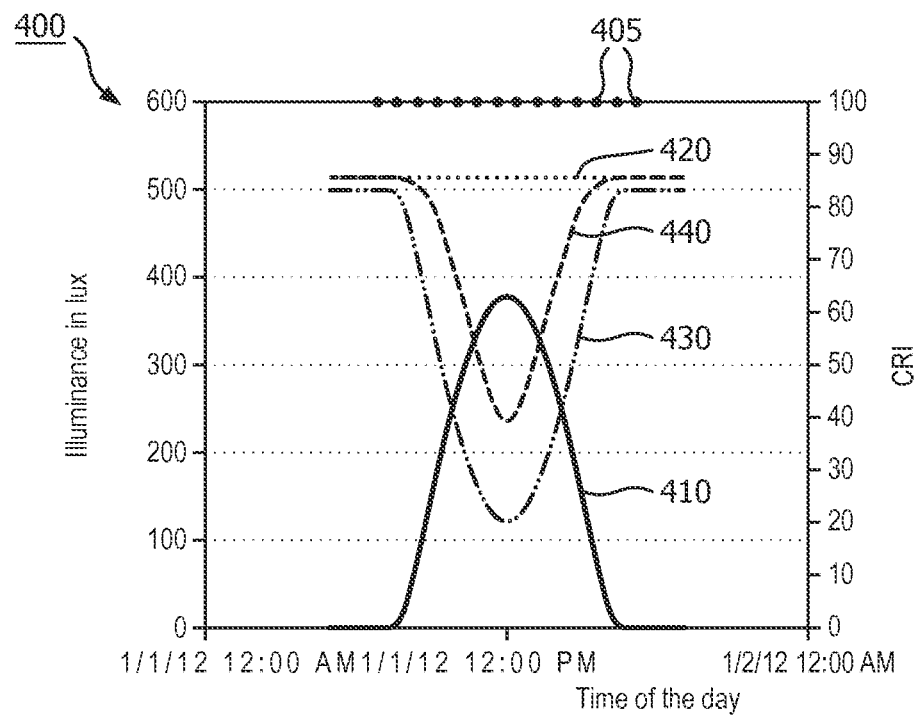
FIGS. 4-7 illustrate graphs for exemplary applications of the invention claimed.

FIG. 4 illustrates a graph 400 of the operation of the adjustment of the CRI in view of a change in natural light that may enter an enclosed area, (e.g., area 134) while maintaining a desired or predetermined CRI of mixed light according to a predetermined schedule in accordance with the principles of the invention. In this exemplary operation, FIG. 4 represents, on the x-axis a time of day between 12:00 AM of an exemplary date of Jan. 1, 2012, through 12:00 AM of the next day (i.e., Jan. 2, 2012). The left most y-axis represents an illuminance (in lux) of an area, a space or an environment and the right most y-axis represents the CRI within the space (or environment).

Line 410 represents a typical variation in daylight illuminance (in lux) throughout the day at a reference location (space, environment) between the times of 12 AM of one day through to 12 AM of the next day. As would be recognized, as the daylight increases from sunrise (approximately 6 AM) to sunset (approximately 6 PM) the illuminance of the natural light increases from a minimum value (at 6 AM) to a maximum value (e.g., 380 lux) at 12 Pm back to a minimum value (at 6 PM).

As an example of the processing of the present invention, a target illuminance at the reference location (e.g., area 134) is 500 lux. To maintain illuminance of 500 lux, the artificial light sources are dimmed (i.e., intensity dimming) in proportion to the increase in daylight illuminance. Thus, the illuminance contributed by the artificial light sources, which is depicted by line 430 decreases as the daylight illuminance increases. Thus, the artificial light source illuminance, which may be initially set at the target illuminance of 500 lux to maintain the target illuminance when no daylight is present, is reduced as the daylight illuminance increases from approximately 6 AM to approximately 12 PM. The electric light source illuminance may then be increased as the daylight illuminance decreases from 12 PM to 6 AM, such that the illuminance of the mixed light created by the combination of the daylight and artificial light sources maintains the desired illuminance (e.g., 500 lux).

In addition, line 405 illustrates a typical CRI of natural light (i.e., 100 percent) and line 440 illustrates the varying CRI of the electric light source according to the principles of this invention in order to maintain a desired CRI (i.e., 85 as presented by line 420) of the mixed light. In this illustrated example, the CRI of the electrical light source is set to a desired value (e.g., 85) in the absence of daylight (e.g., between 12 AM and 6 AM). As the daylight increases from 6 AM to 12 PM the CRI of the electrical light sources is altered as the electrical light sources are intensity dimmed. Thus, by varying the CRI of the electric light source(s) as the electric light sources are intensity dimmed, the CRI of the mixed light may be maintained at the desired level (e.g., 85) as represented by line 420. Additional, as the daylight decreases (12 PM to 6 AM), the CRI of the electrical light source(s) in again increased such that the combined CRI of the mixed light (i.e., daylight and artificial light source) is maintained at the desired level (e.g., 85).

Accordingly, by dynamically varying the CRI of electric light in the presence of the natural light source, a significant energy can be saved over and above the savings afforded by conventional intensity dimming while maintaining the quality of overall illumination.

Figure 5:
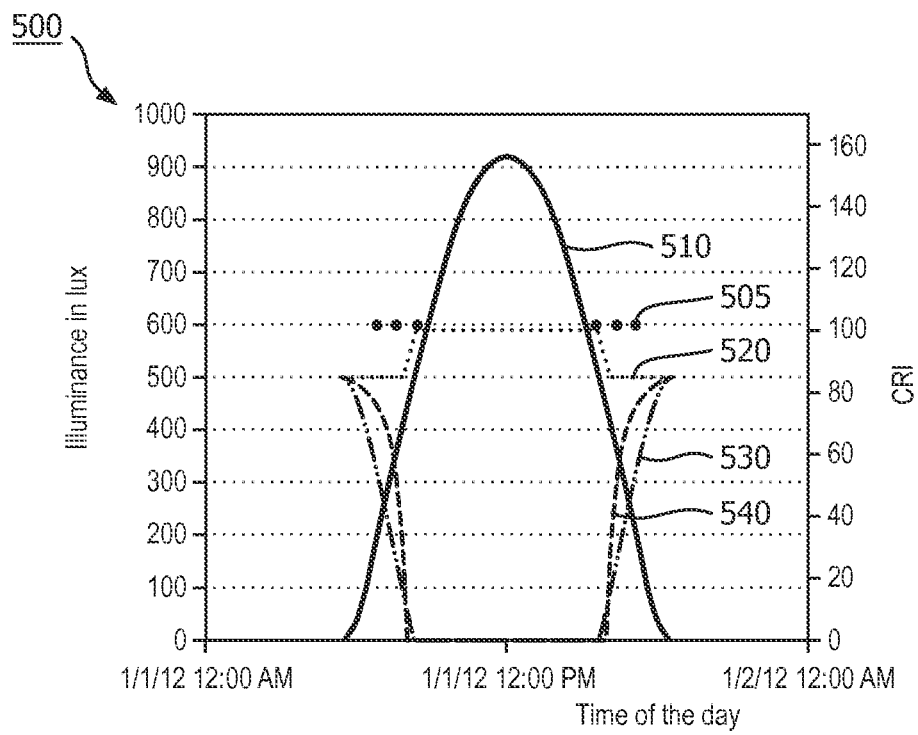

FIG. 5 illustrates a graph 500 of another exemplary operation of the adjustment of the CRI of an illumination source in accordance with the principles of the invention. In this exemplary operation, the x-axis and the right y-axis and left y-axis of FIG. 5 are the same as those of FIG. 4 and need not be repeated herein.

Line 510 represents a typical variation in daylight illuminance (in lux) throughout the day at a reference location between the times of 12 AM through to 12 AM, as previously described. A target illuminance at the reference location (e.g., area 134) is again set to an exemplary 500 lux. To maintain illuminance of 500 lux, the electric lights are dimmed in proportion to the daylight which is depicted by line 530 (intensity dimming), as previously described with regard to FIG. 4. However, in this case, as the illuminance of the natural light exceeds the desired 500 lux, at approximately 10 AM, the output of the illuminating or artificial light source(s) is driven to zero (line 540). That is, as the daylight alone is sufficient to provide the target illuminance, there is no need to expend any energy in providing illuminance from the artificial light sources. As the artificial light source(s) is driven to zero output, the CRI of the artificial light source is also zero and the CRI of the mixed light rises from 85 (line 520) to 100 (line 505), which is comparable to the CRI of the natural light. Similarly, as the natural light decreases with the passage of time, the illuminance of the daylight falls below the target illuminance (at approximately 2 PM) and the artificial light source(s) is turned on to provide sufficient illuminance to maintain the target illuminance. The illuminance from the artificial light source(s) increases as the daylight decreases such that the target illuminance (e.g., 500 lux) is maintained. In addition, the CRI of the artificial light sources is increased, as represented by line 530 to maintain the mixed light CRI at the desired level (e.g., 85).

Figure 6:
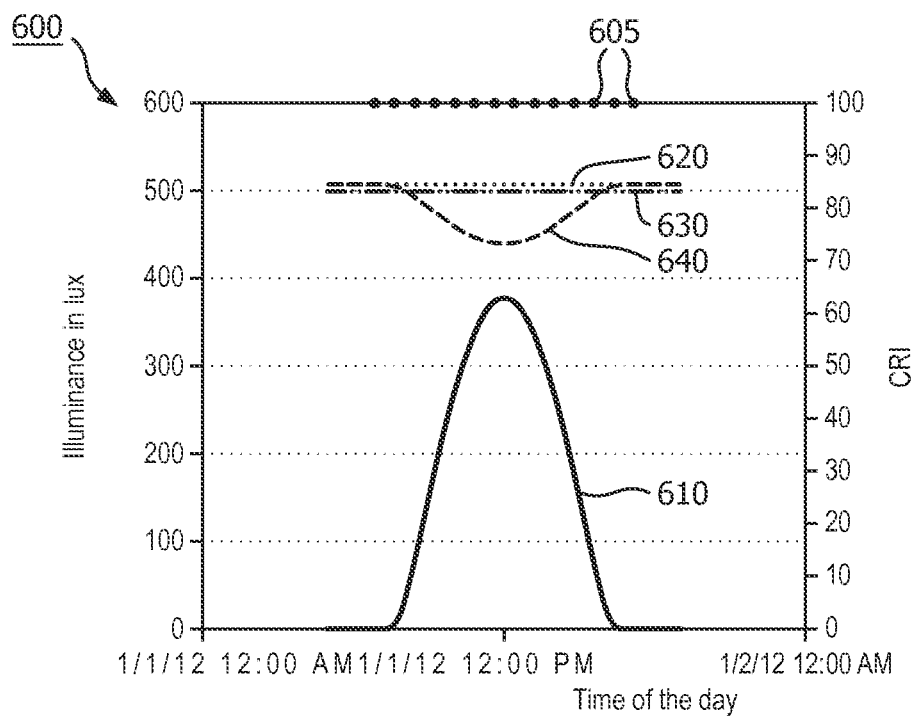
Figure 7:
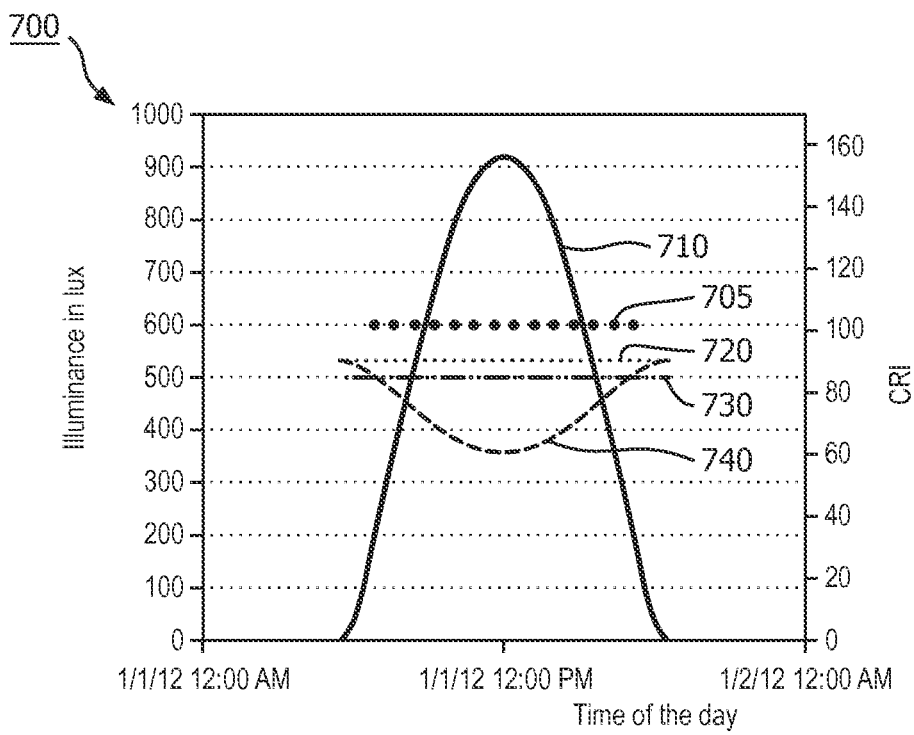

FIGS. 6 and 7 illustrate graphs 600, 700, respectively, of an exemplary operation of the adjustment of the CRI of an illumination, electrical, or artificial light source without intensity dimming of the artificial light source in accordance with the principles of the invention. The axis of FIGS. 6 and 7 are similar to those described with regard to FIG. 4 and the description of these quantities need not be repeated again, herein.

In FIG. 6, line 610 represents the illuminance of the natural light, and line 630 represents the illuminance contributed by the artificial light source. Lines 605 and 620 represent the CRI of the natural light and a target mixed light, respectively, as previously described. Line 640 represents the adjustment to the CRI of the electric light sources as the illuminance of the daylight (line 610) increases (and decreases) to maintain the target CRI of the mixed light (daylight+light source) at the target level (e.g., 85).

Thus, the CRI of the artificial light source is adjusted, as previously described (line 640), while the illuminance of the artificial light source remains constant as the light source(s) is not dimmed (line 630).

In FIG. 7, which illustrates a case similar to FIG. 5, wherein the illuminance of the daylight exceeds the target illuminance (e.g., 500 lux) and similar to FIG. 6, wherein the artificial sources are not dimmed. In this case, line 710 represents the illuminance of the natural light, which becomes greater than the desired target luminance (i.e., 500 lux) during the period approximately between 10 AM and 2 PM. Line 705 represents the CRI of the natural light (i.e., 100), as previously described and e line 720 represents the CRI of the mixed light maintained at the desired target level (e.g., 85). Line 730 represents the illuminance of the artificial light source(s) and line 740 illustrates the adjustment of the CRI of the artificial light source as the illuminance of the natural light increases without dimming of the light sources.

It would be noted that because the electric light source is not dimmed and remains in an "on" state, and the CRI of the mixed light remains at the desired CRI, the CRI of the artificial light sources is adjusted (line 740) as the illuminance of the natural light source (i.e., daylight) increases/decreases.

As would be appreciated, the principles of the invention may be extended to account for non-uniform distribution of daylight and multiple light sources in a space Typically, in indoor environments or areas, the daylight enters the space through windows or skylights. Daylight intensity decreases in the interior of the space as the distance from window or skylight increases. Also, most spaces are lit using multiple light sources/luminaires (see FIG. 2, elements 240). Thus the overall CRI at a reference location within an area (e.g., 130) is a sum of weighted linear combination of CRIs of light sources (daylight+electric light). The weight of each light source is the fraction of illuminance contributed by that source. In this scenario, deriving the CRI of each electric light source individually using the above process will result in an approximate CRI distribution.

Hence, to provide for a more complete solution of the multiple light source CRI distribution, when an environment is illuminated by N tunable CRI light sources and daylight, M reference points may be defined in the environment where a desired CRI of mixed light above a pre-defined value $C_M$ is to be maintained. The illuminance contributed by electric light source i at a reference point j is denoted by $I_{ij}$. The illuminance contributed by daylight at a reference point j is denoted by $I_{Dj}$. The CRI of daylight is constant and denoted by $C_D$. The objective is to find the CRI of each electric light source (i) denoted by $c_{Ei}$ such that the sum of CRIs of all the electric light sources is minimized. The feasible range of $c_{Ei}$ is bounded by upper bound ($C_{EMax}$) and lower bounds ($C_{EMin}$). Note that in the below problem formulation, except for the CRIs of electric light sources ($c_{Ei}$), all the other quantities are fixed.

The illuminance ($I_{Dj}$) contributed by daylight at a reference point j can be measured by a photo-sensor located at point j when all the electric light sources are turned off. The illuminance contributed by electric light source i at a reference point j can be measured by a photo-sensor placed at point j when electric light source i is on but all other light sources are turned off and daylight is absent. If daylight is present then daylight can be subtracted from the photo-sensor measurement to derive the contribution of a given electric light.

$$\text{Min} \sum_{i=1}^{N} c_{E_i} \sum_{i=1}^{N} \frac{I_{ij}}{\sum_{k=1}^{N} I_{kj} + I_{Dj}} c_{E_i} + \frac{I_{Dj}}{\sum_{k=1}^{N} I_{kj} + I_{Dj}} C_D \geq C_M$$

$$\forall j = 1, \ldots, M$$

$$c_{E_{Min}} \leq c_{E_i} \leq c_{E_{Max}}$$

$$\forall i = 1, \ldots, N$$

Above is a linear optimization problem which can be easily solved using well known methods. This problem must be solved again whenever the daylight or electric light intensity changes. When the daylight is absent, a feasible solution is readily found by setting $c_{Ei}=C_M$ for all i=1, ..., N. In other words, in the absence of daylight all the electric lights can be set to the pre-defined CRI to ensure that the CRI requirements are met.

In accordance with an aspect of the invention, when no daylight is present (i.e., when time is between 12 AM and 6 AM and between 6 PM and 12 AM in FIG. 4, or when the lighting is within area 136 (no outside light source), then the CRI of the illumination source may be adjusted to take advantage of a tradeoff between CRI and luminous efficiency.

One of the applications of this method is to save costs by reducing load during the peak pricing and peak demand periods. Utility companies have to build infrastructure to meet peak demand which incurs higher capital expenditure. Furthermore, the cost of generating additional power on a short notice is significantly higher because it employs expensive technologies. Thus, to reduce peak demand utility companies encourage their customers to cut back on peak demand by charging them more in proportion to their peak demand. Customers have financial incentives to actively manage their demand and shed the unnecessary load to prevent demand spikes. Additionally during energy shortages, the utility companies send demand response signal to customers requesting and sometime mandating them to shed demand.

In addition to peak demand based charges, the customers are also charged based on actual usage of electricity measured in kWHr (kilowatthours). The rates of electricity vary by time-of-day and seasonally. To incentivize load shifting/shedding, the utility companies charge higher tariff during on-peak durations and lower tariffs during off-peak durations. Some utility companies have three tire rate schedule for on-peak, mid-peak and off-peak durations where electricity rates during on-peak durations are typically the highest followed by mid-peak duration, followed by off-peak duration. Thus, for customers it would be beneficial not only to reduce peak-demand but also to draw less power from grid during on-peak hours.

To prevent demand spikes from overwhelming the grid during critical shortages, the cost of electricity during critical peak pricing events is generally an order of magnitude higher compared to off-peak periods. Hence, shedding the load from grid during on-peak and CPP periods can significantly reduce the energy costs.

For example, during the off-peak periods (e.g. 11 p.m. to 8 a.m., weekdays and all day on weekends, including holidays during summer season) the CRI of the artificial illumination light sources may be set to a specified minimum value whereas during on-peak durations (e.g. Noon to 6 p.m., weekdays except holidays during summer season) the CRI of the electrical light source(s) may be allowed to drift lower while maximizing the luminous efficacy. Similarly when a light source operates in a demand saver mode (e.g. during a demand response or critical peak pricing event), attempts to maximize the luminous efficacy while sacrificing the CRI may provide significant savings. Thus, when an area, for example, 136 of FIG. 2, is occupied, (i.e., a comfort mode) the present invention maintains the CRI to a pre-defined minimum value while attempting to improve luminous efficacy.

Figure 8:
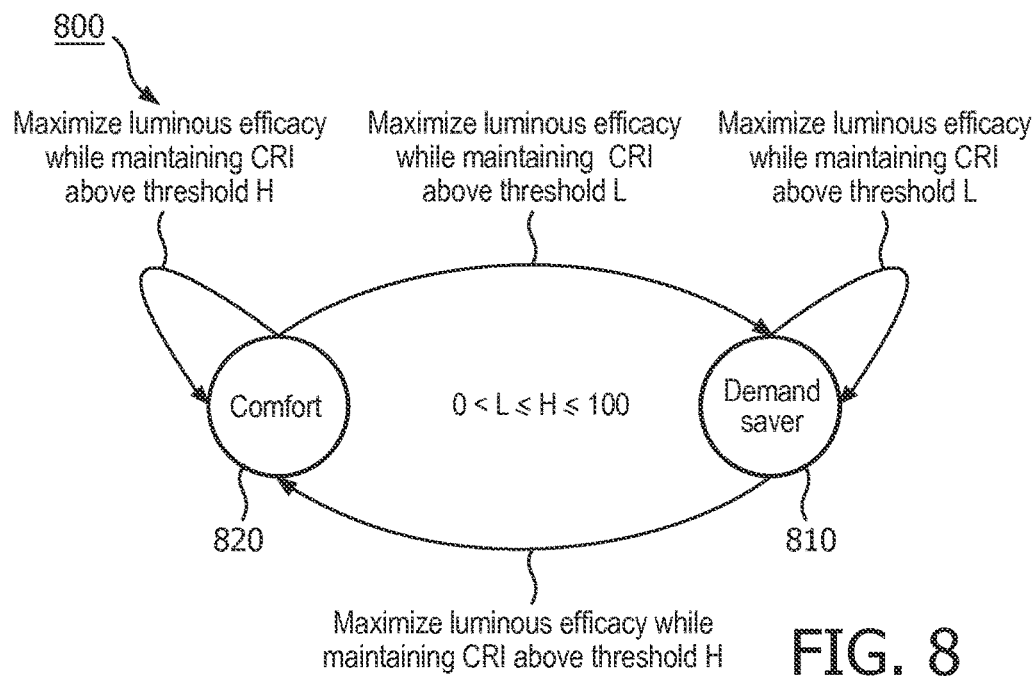
FIGS. 8 and 9 illustrate state transition diagrams in accordance with an aspect of the invention.

FIG. 8 illustrates state transition diagram 800 of an exemplary embodiment of the invention. In this embodiment, the light source(s) 240 (FIG. 2) operates in either a demand saver mode (810) or in a comfort mode (820). Whether a light source operates under demand saver mode (810) or comfort mode (820) is decided based on the demand response signals from the utility or inputs from a facility manger (e.g., power grid). In the comfort mode (820), a higher CRI value is desirable for occupant comfort and visual acuity. Hence, according to the principles of this invention, in the comfort mode (82), the light source is driven to maximize the luminous efficacy while maintaining the CRI above a threshold denoted by H in FIG. 8. On the hand when the demand saver mode (810) is activated, the light source is driven to maximize the luminous efficacy while maintaining the CRI above a threshold denoted by L in FIG. 8. In this embodiment, 0<L≤H≤100. Additional efficacy gains achievable due to a change in the CRI threshold from a high value H to a low value L is proportional to the absolute difference between H and L. Large difference leads to higher energy savings and vice versa.

Figure 9:
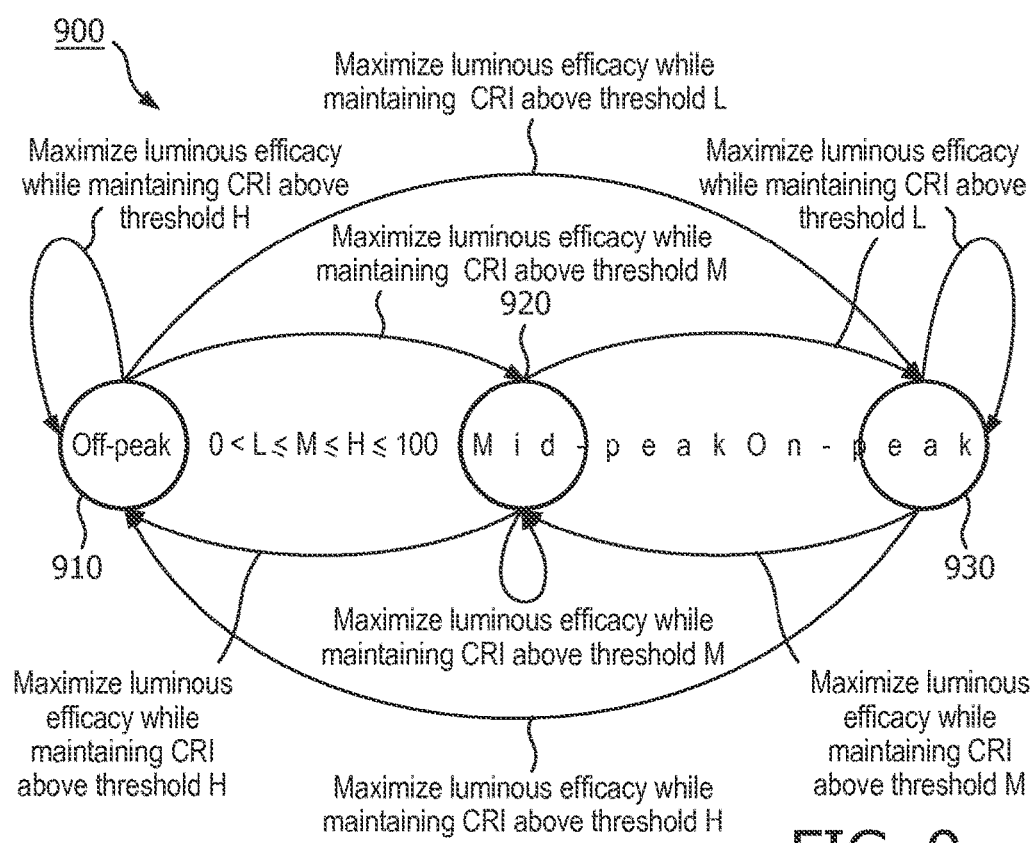

FIG. 9 illustrates a state transition diagram 900 of a second aspect of the invention. In this aspect of the invention, the light source operates in one of the three modes, namely, Off-peak 910, Mid-peak 920 and On-peak 930. The state transition among various modes is governed by time of use and/or utility pricing. For example, during off-peak pricing periods, the source operates in an off-peak mode 910. Similarly, during an on-peak pricing period the source operates in an on-peak mode 930.

In the off-peak period (910), a higher CRI value is desirable. Hence, according to the principles of this invention, the light source is driven to maximize the luminous efficacy while maintaining the CRI above a threshold denoted by H. On the hand during on-peak period (930), the light source is driven to maximize the luminous efficacy while maintaining the CRI above a threshold denoted by L. During mid-peak period (920), the light source is driven to maximize the luminous efficacy while maintaining the CRI above a threshold denoted by M. In this embodiment, 0<L≤M≤H≤100. Typically, L<M<H.

It is understood that in many applications, the light intensity may change with the change in mode of operation. For example the lights may dim in demand saver mode. Moreover, the CCT of the source may also change in addition to the dimming of the source. The principles of this aspect of the invention can be applied irrespective of whether the lights are dimmed, brightened or maintained at the same level, or CCT of the light source is changed or maintained at the same level.

Another aspect of the invention is to dynamically exploit the trade-off between the CRI and luminous efficacy based on the operating conditions to save energy. For example, when the space is occupied the CRI is set to the specified value (i.e., target values) whereas when space is unoccupied the CRI is allowed to drift lower while maximizing the luminous efficacy. Similarly when a light source operates in energy saver mode, in accordance with the principles of the invention, attempts to maximize the luminous efficacy while sacrificing the CRI is performed whereas in a comfort mode the invention maintains the CRI to a per-defined value while attempting to improve luminous efficacy.

Figure 10:
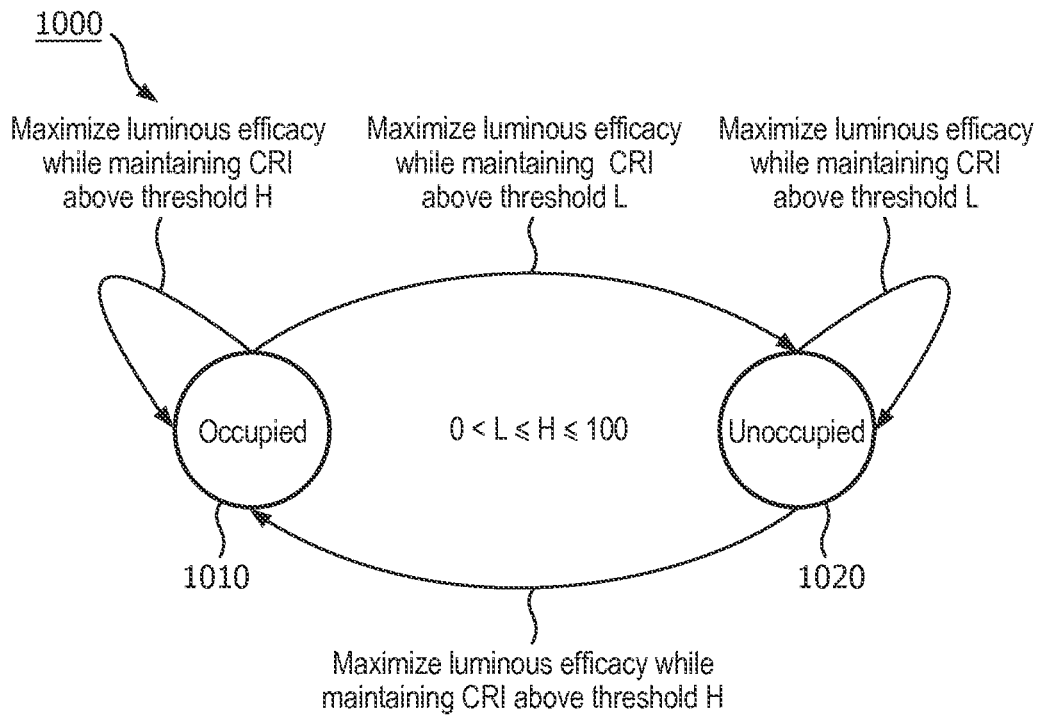
FIGS. 10 and 11 illustrates state transition diagrams in accordance with another aspect of the invention.

FIG. 10 illustrates a state transition diagram 1000 in areas such as 133, FIG. 2, wherein the lighting may be required to be maintained whether the area is occupied or not, as this area may represent an emergency route.

In this embodiment, the light source 240 operates in either an occupied mode 1010 or in an unoccupied mode 1020. Whether a space (e.g., 133) is occupied or unoccupied is decided based on the input(s) from associated occupancy/motion sensor(s) (or other types of sensors) that monitor the space. A variety of occupancy sensors are available in the market that can detect whether a space is occupied or unoccupied using Infra-Red, Ultrasound and/or Microwave technology. In the occupied state 1010, a higher CRI value is desirable for occupant comfort and visual acuity. Similarly, in surveillance applications, when motion is detected, a higher CRI value is preferred for a better picture quality. Hence, according to the principles of this invention, in the occupied state 1010, the light source is driven to maximize the luminous efficacy while maintaining the CRI above a threshold (target value) denoted by H. On the hand when the space is vacated (unoccupied), 1020, the light source is driven to maximize the luminous efficacy while maintaining the CRI above another threshold denoted by L. In this embodiment of the invention, $0<L \leq H \leq 100$. Additional efficacy gains achievable due to change in the CRI threshold from a high value H to a low value L is proportional to the absolute difference between H and L. Large difference leads to higher energy savings and vice versa.

Figure 11:
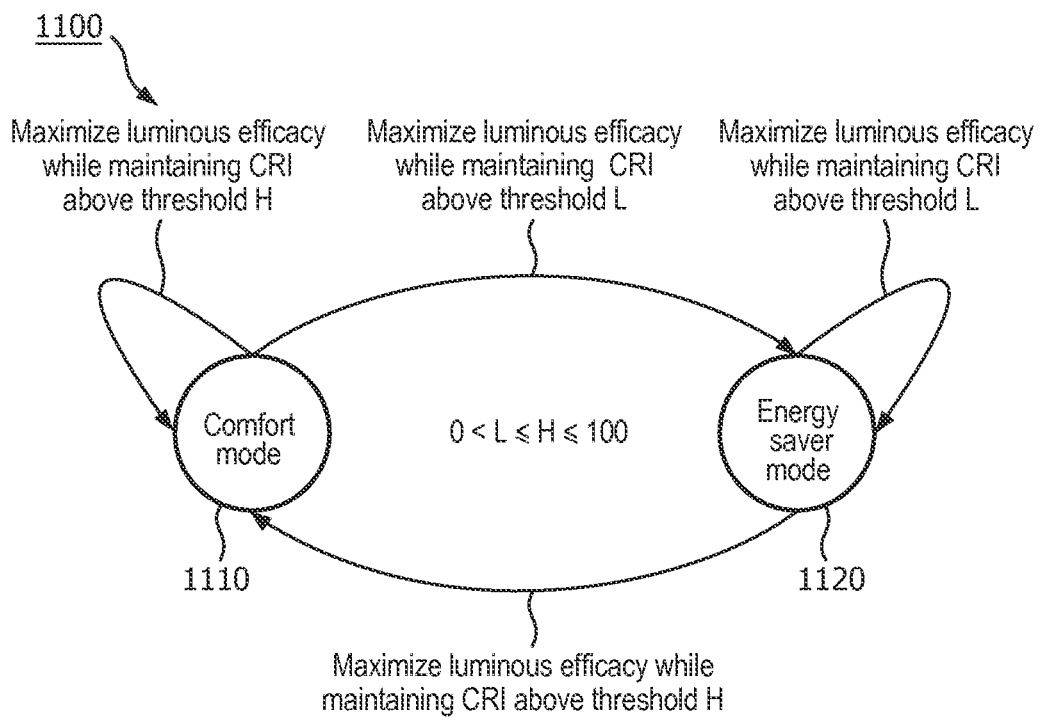

FIG. 11 illustrates a state transition diagram of another embodiment of the invention. In this embodiment, the light source operates in either a comfort mode 1110 or in an energy saver mode 1120. The state transition between the comfort and energy saver modes may be governed by one or more of the following conditions.

1) When the power is drawn from a mains supply, the module operates in comfort mode 1110. However, the module transitions to energy saver mode 1120 if mains power supply is disrupted and backup power supply (e.g. battery) is used to power the module.
2) The module operates in comfort mode 1110 during regular operating hours. However, during afterhours (e.g. nights and weekends) the module may transition to energy saver mode 1120 based on the pre-defined schedule.
3) In applications such as cinematography and photography the light module may operate in energy saver mode 1120 when camera is idle. On the other hand the light module can be driven in comfort mode 1110 when camera is on.

In the comfort mode 1110 a higher CRI value is desirable. Hence, according to the principles of this invention the light source is driven to maximize the luminous efficacy while maintaining the CRI above a threshold (a target value) denoted by H. On the hand, during energy saver mode 1120, the light source is driven to maximize the luminous efficacy while maintaining the CRI above a threshold (a target value) denoted by L. In this embodiment $0<L \leq H \leq 100$. Typically, $L<H$.

It is understood that in many applications, the light intensity may change with the change in mode of operation. For example the lights may dim in energy saver mode. The principles of this invention can be applied irrespective of whether the lights are dimmed, brightened or maintained at the same level.

Another aspect of the invention is to dynamically tune the CCT (Correlated Color Temperature) based on the operating conditions to save energy. For example, when the space is occupied the CCT is set to the specified value whereas when space is unoccupied the CCT is sacrificed for higher luminous efficacy. Similarly when a light source operates in energy saver mode, according to the principles of the invention the luminous efficacy may be maximized while allowing the CCT to drift whereas in comfort mode it maintains the CCT to a per-defined value (i.e., target value) while attempting to improve luminous efficacy.

Figure 12:
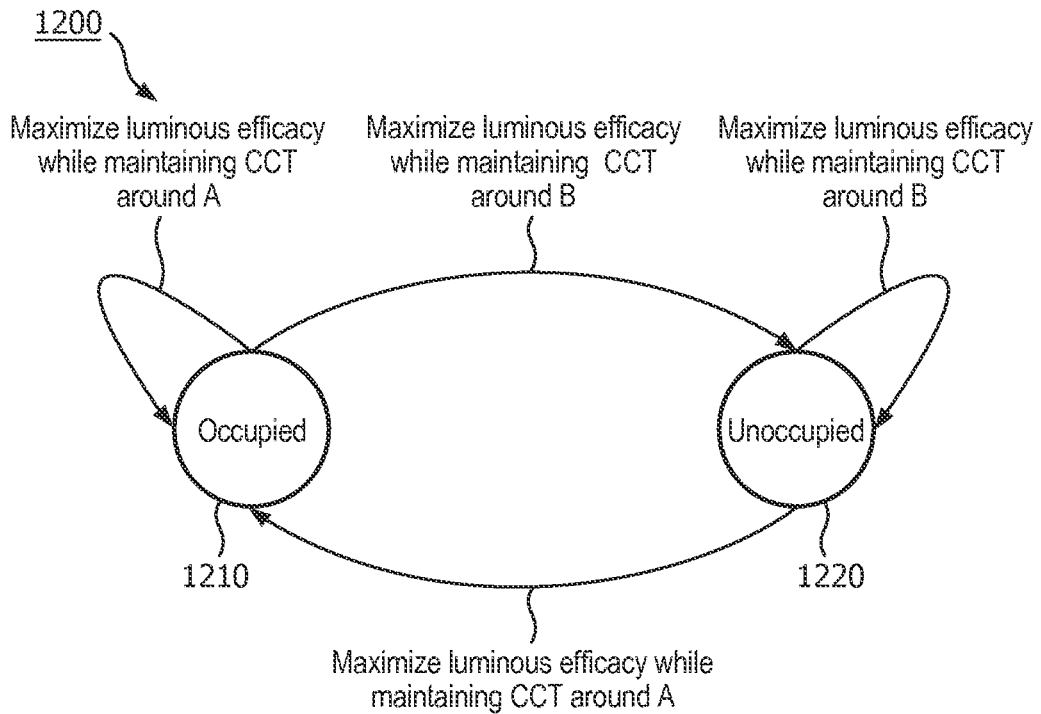
FIGS. 12-14 illustrate state transition diagrams in accordance with still another aspect of the invention.

FIG. 12 illustrates a state transition diagram of an embodiment of the invention. In this embodiment, the light source operates in either the occupied mode 1210 or in the unoccupied mode 1220. Whether a space is occupied or unoccupied is decided based on the input(s) from the associated occupancy/motion sensor(s) that monitor the said space. A variety of occupancy sensors are available in the market that can detect whether a space is occupied or unoccupied using Infra-Red, Ultrasound and/or Microwave technology. In the occupied state, CCT can be tuned for occupant comfort and visual acuity. Similarly, in the surveillance applications, when motion is detected, the CCT may be tuned for a better picture quality. Hence, according to the principles of this invention, in the occupied state, the light source is driven to maximize the luminous efficacy while maintaining the CCT near the threshold denoted by A. On the hand, when the space is vacated (1120) the light source is driven to maximize the luminous efficacy while maintaining the CCT near a threshold denoted by B. Typically, for blue LED generated and phosphor converted white light, A<B i.e. generating higher CCT cool white light is generally more efficient than generating lower CCT warm white light. Additional efficacy gains achievable due change in the CCT threshold is proportional to the absolute difference between A and B. Large difference leads to higher energy savings and vice versa.

Figure 13:
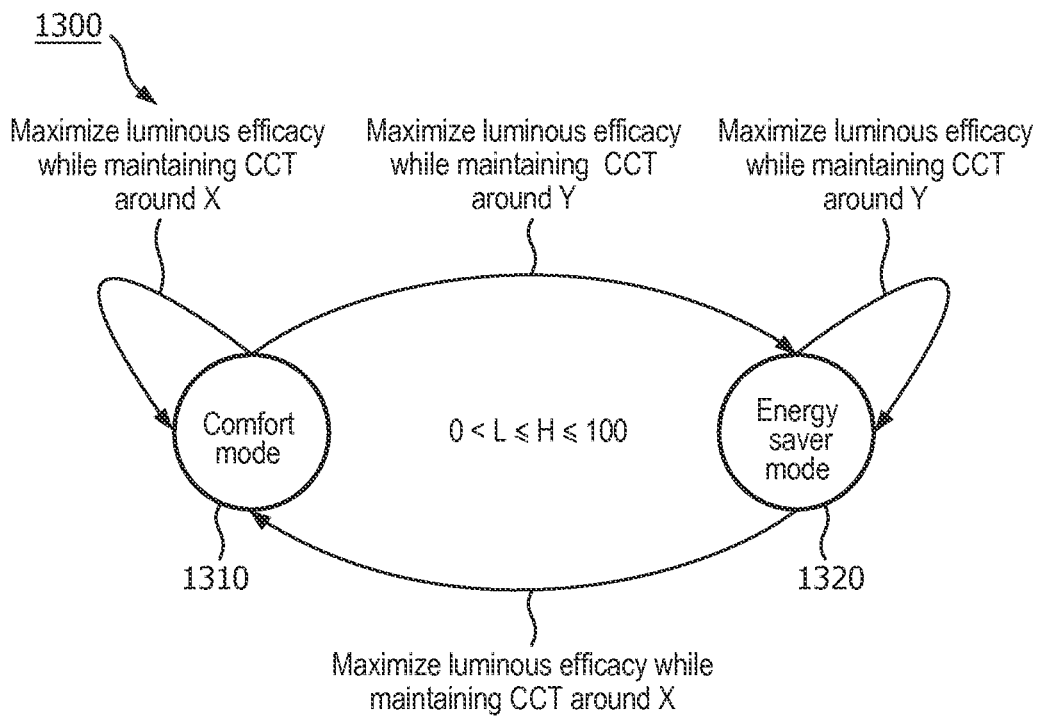

FIG. 13 illustrates a state transition diagram 1300 of another embodiment of the invention. In this embodiment, the light source operates in either the comfort mode 1310 or in the energy saver mode 1320. The state transition between the comfort and energy saver modes could be governed by one or more of the following conditions.

1) When the power is drawn from mains supply, the module operates in comfort mode. However, the module transitions to energy saver mode if mains power supply is disrupted and the backup power supply (e.g. battery) is used to power the module.
2) The module operates in comfort mode during regular operating hours. However, during afterhours (e.g. nights and weekends) the module may transition to energy saver mode based on the pre-defined schedule.
3) In applications such as cinematography and photography the light module may operate in energy saver mode when camera is idle. On the other hand the light module can be driven in comfort mode when camera is on.

4) In a demand response application, whether a module operates under energy saver mode or comfort mode is decided based on the demand response signals from the utility or inputs from the facility manger.

In the comfort mode 1310, CCT is tuned for visual comfort of the occupants or to meet the requirements of the applications (e.g. photography). Hence, according to the principles of this invention, the light source is driven to maximize the luminous efficacy while maintaining the CCT near a threshold denoted by X. On the hand during energy saver mode 1320, the light source is driven to maximize the luminous efficacy while maintaining the CCT near a threshold denoted by Y. As discussed above, typically, X<Y.

Figure 14:
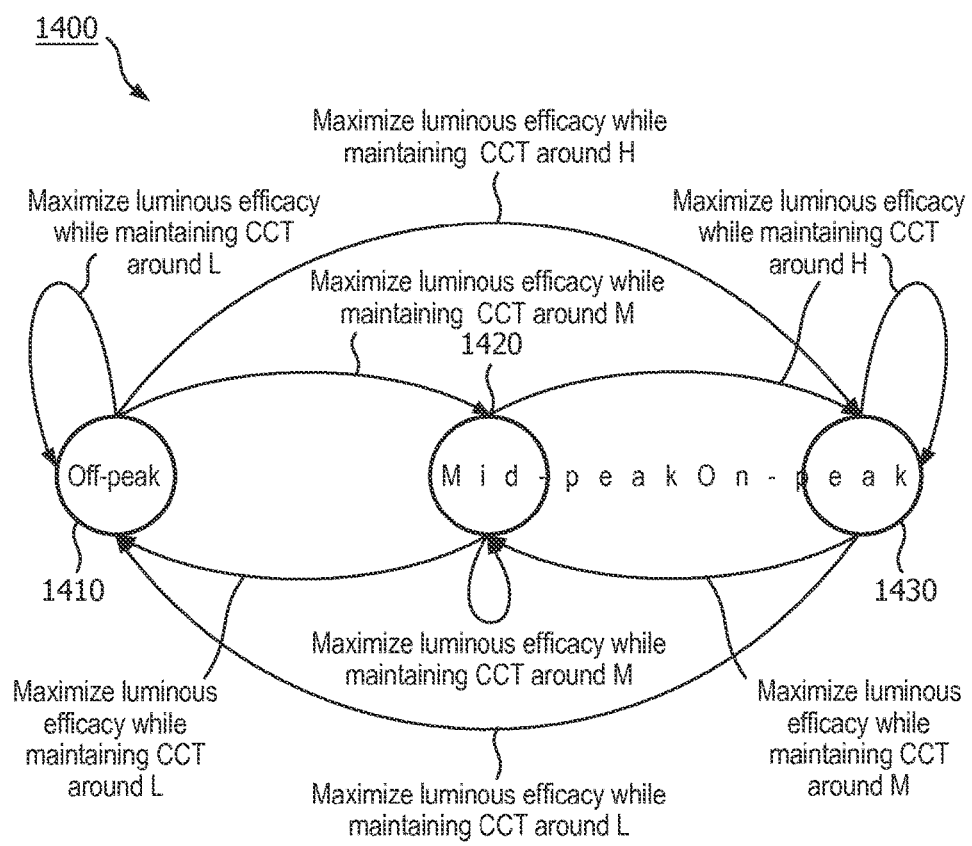

FIG. 14 illustrates a state transition diagram 1400 of yet another embodiment of the invention. In this embodiment, the light source operates in one of the three modes, namely, Off-peak 1410, Mid-peak 1420 and On-peak 1430. The state transition among various modes is governed by time of use and/or utility pricing. For example, during off-peak pricing period, the source operates in off-peak mode. Similarly, during on-peak pricing period the source operates in on-peak mode.

During the off-peak period 1410, CCT is tuned for visual comfort of the occupants. Hence, according to the principles of this invention, the light source is driven to maximize the luminous efficacy while maintaining the CCT around a threshold (target value) denoted by L. On the hand during on-peak period 1430, the light source is driven to maximize the luminous efficacy while maintaining the CCT around a threshold (target value) denoted by H. During the mid-peak period 1420, the light source is driven to maximize the luminous efficacy while maintaining the CCT around a threshold (target value) denoted by M. Since LED efficiencies are proportional to CCT, higher CCT means higher efficiency. Thus, typically, L<M<H.

It is understood that in many applications, the light intensity may change with the change in mode of operation. For example the lights may dim in the off-peak mode. Moreover, the CCT of the source may also change in addition to dimming. The principles of this invention can be applied irrespective of whether the lights are dimmed, brightened or maintained at the same level, or CRI of the light source is changed or maintained at the same level.

Although principles of the invention are described with regard to CRI and CCT, the methods disclosed herein are equally applicable to other color rendering metrics or characteristics, such as Color Quality Scale (CQS), Gamut Area Index (GAI), Gamut Area Scale (GAS), Color Harmony Rendering Index (HRI), and Delta-uv (Duv).

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote non-transitory recording medium or a non-transitory machine readable medium and to be stored on a local recording medium, so that the methods described herein can be rendered in such software that is stored on the recording medium using a general purpose computer(s), or a special processor(s) or in programmable or dedicated hardware(s), such as an ASIC or FPGA. As would be understood in the art, the computer(s), the processor(s), microprocessor controller(s) or the programmable hardware(s) include memory components, e.g., RAM, ROM, Flash, etc. that may store or receive software or computer code that when accessed and executed by the computer(s), processor(s) or hardware(s) implement the processing methods described herein. In addition, it would be recognized that when a general purpose computer(s) accesses code for implementing the processing shown herein, the execution of the code transforms the general purpose computer(s) into a special purpose computer(s) for executing the processing shown herein.

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

While there has been shown, described, and pointed out fundamental and novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method, operable in a computer system, for managing lighting in an environment, the method comprising:
   receiving illuminance information associated with at least one artificial lighting source within said environment;
   determining an illuminance value associated with a natural light source;
   determining a measure of said illuminance of said natural light source with respect to an illuminance of a mixed light, said mixed light representing illuminance of said at least one lighting source and said natural light source;
   determining at least one additional characteristic of said mixed light based on a corresponding at least one additional characteristic of said at least one artificial light source and said natural light source; and
   coordinating an adjustment of said illuminance of said at least one artificial light source and said at least one additional characteristic of said at least one artificial light source to maintain a target level of said at least one additional characteristic, wherein said adjustment is based on said determined measure of illuminance of said natural light source with respect to an illuminance of said mixed light.

2. The method of claim 1, wherein said at least one additional characteristic is determined from a group consisting of: Color Rendering Index, Correlated Color Temperature, Color Quality Scale (CQS), Gamut Area Index (GAI), Gamut Area Scale (GAS), Color Harmony Rendering Index (HRI), and Delta-uv (Duv).

3. The method of claim 1, further comprising:
setting said target level of said at least one additional characteristic based on whether said environment is one of: occupied and unoccupied.

4. The method of claim 1, further comprising:
setting said target level of said at least on additional characteristic based on whether said environment is one of: a comfort mode, a demand saver mode and an energy saver mode.

5. The method of claim 4, wherein said target level of said at least one additional characteristic is higher in said comfort mode than said target level in said demand saver mode and said energy saver mode.

6. The method of claim 1, further comprising:
setting said target level of said at least one additional characteristic based on an input associated with a mode selected from a group consisting of: On-peak, Mid-peak and Off-peak, wherein said target level of said On-peak is greater than a target level of said Mid-peak which is greater than a target level of said Off-peak.

7. The method of claim 1, wherein said target level of said at least one additional characteristic is based on one of: a predetermined schedule, a time of use, a utility pricing and a received input value.

8. A system for managing lighting within an environment, said system comprising:
a plurality of sensor units within said environment;
a computer in communication with said plurality of sensor units and a memory, the memory including code, which when accessed by said computer, causes said computer to execute the steps of:
receiving inputs from selected ones of said plurality of sensor units;
determining illuminance contributed by at least one lighting source and a natural light source;
determining a factor associated with the percentage of illuminance provided by said natural light source with respect to a total illuminance provided by a combination of said natural light source and said at least one lighting source; and
coordinating an adjustment of at least one of the illuminance and at least one additional characteristic of said at least one light source to a corresponding target level based on said illuminance of said natural light source and a corresponding at least one additional light source associated with said natural light source, wherein said adjusting of said at least one additional characteristic is based on said determined factor.

9. The system of claim 8, wherein said at least one additional characteristic is determined from a group consisting of: Color Rendering Index, Correlated Color Temperature, Color Quality Scale (CQS), Gamut Area Index (GAI), Gamut Area Scale (GAS), Color Harmony Rendering Index (HRI), and Delta-uv (Duv).

10. The system of claim 8, further comprising:
setting the target level of said at least one additional characteristic based on whether said environment is one of: occupied and unoccupied.

11. The system of claim 10, wherein said target level of said at least one additional characteristic is higher in said occupied environment than said target level in said unoccupied environment.

12. The system of claim 8, further comprising:
setting said target level of said at least on additional characteristic based on whether said environment is one of: a comfort mode, a demand saver mode and an energy saver mode.

13. The system of claim 8, further comprising:
setting said target level of said at least one additional characteristic based on an input associated with a mode selected from a group consisting of: On-peak, Mid-peak and Off-peak, wherein said target level of said On-peak is greater than a target level of said Mid-peak which is greater than a target level of said Off-peak.

14. A computer program product containing code thereon, said code when loaded into a computer system causes the computer system to execute the steps of:
receiving illuminance information associated with at least one lighting source within said environment;
receiving illuminance value associated with a natural light source;
determining a measure of said illuminance of said natural light source with respect to an illuminance of a mixed light, said mixed light representing said at least one lighting source and said natural light source;
determining at least one additional characteristic of said mixed light based on a corresponding at least one additional characteristic of said at least one electric light source and said natural light source; and
coordinating an adjustment of said illuminance of said at least one artificial light source and said at least one additional characteristic of said at least one electric light source to maintain a target level of said at least on additional characteristic, wherein said adjustment is based on said determined measure of illuminance of said natural light source with respect to a measure of said illuminance of a mixed light.

15. The computer program product of claim 14, wherein said at least one additional characteristic is determined from a group consisting of: Color Rendering Index, Correlated Color Temperature, Color Quality Scale (CQS), Gamut Area Index (GAI), Gamut Area Scale (GAS), Color Harmony Rendering Index (HRI), and Delta-uv (Duv).

* * * * *